Nov. 26, 1957  J. M. NAUL  2,814,786
SATURABLE REACTOR
Filed Jan. 11, 1955  3 Sheets-Sheet 1

INVENTOR.
JAMES M. NAUL
BY James and Franklin
ATTORNEYS

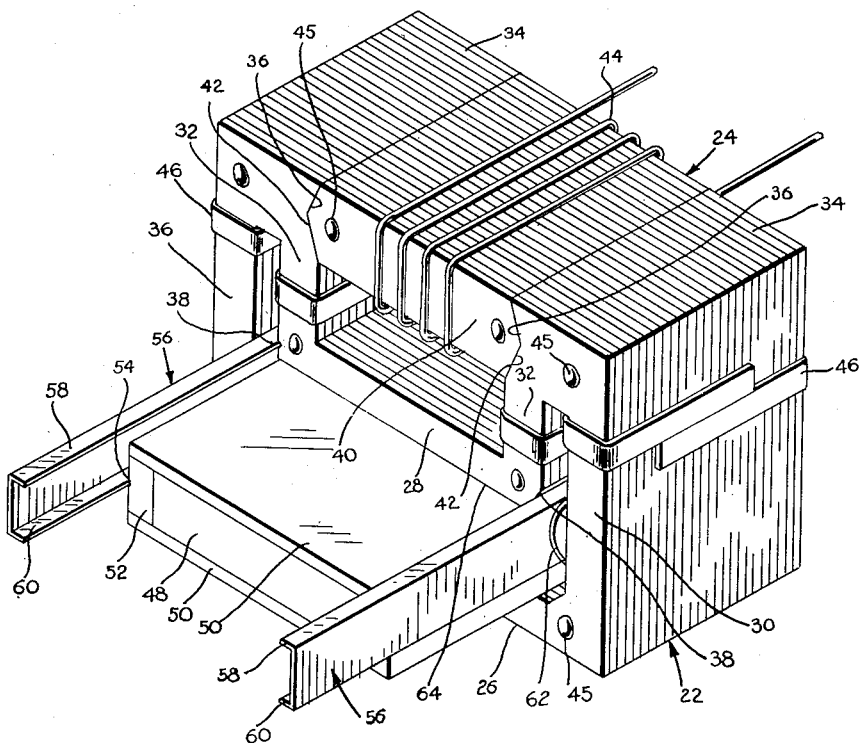

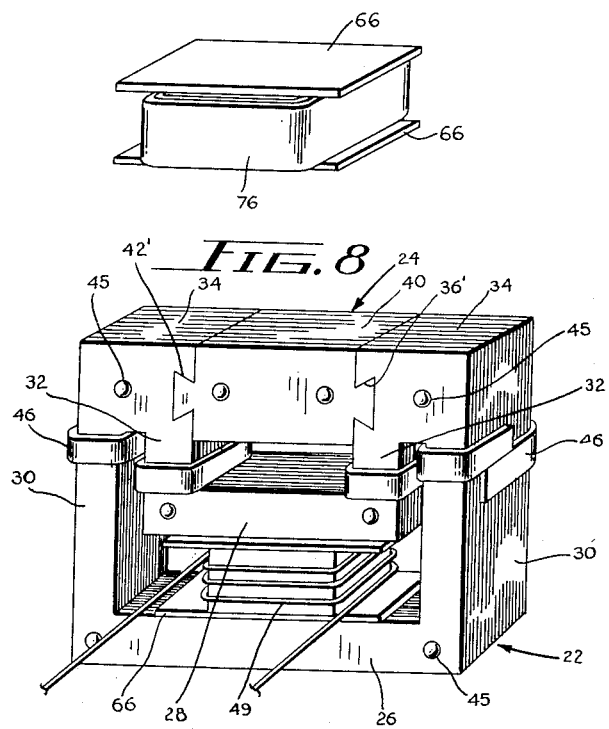
FIG. 8
FIG. 9
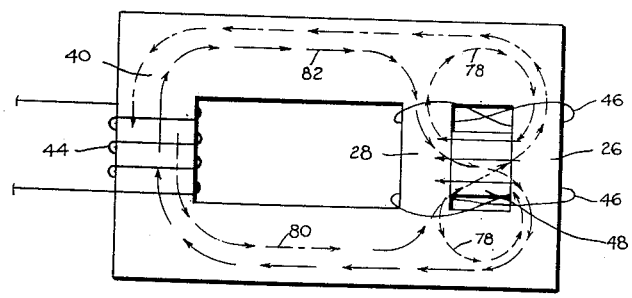
FIG. 10
INVENTOR.
JAMES M. NAUL
BY James and Franklin
ATTORNEYS

United States Patent Office 2,814,786
Patented Nov. 26, 1957

2,814,786

SATURABLE REACTOR

James M. Naul, Plainfield, N. J., assignor to Eastern Air Devices, Inc., Dover, N. H., a corporation of New York Application January 11, 1955, Serial No. 481,058

11 Claims. (Cl. 336—110)

The present invention relates to a novel design for a saturable reactor by means of which the impedance of a coil may be varied.

It has long been known that the effective impedance of a coil may be varied by including that coil (hereinafter termed the "impedance coil") within a magnetic circuit and controlling the degree of magnetic saturation of that circuit. The usual mode of controlling the magnetic status of said circuit, and hence varying the impedance of the coil, is to utilize a second or control coil which is variably energized by a source of direct current, this control coil producing a uni-directional magnetic field in the magnetic circuit, the degree to which the thus produced field approaches saturation of the magnetic circuit determining the impedance of the coil being controlled. The impedance coil is generally connected in an A. C. circuit, and the current passing through the impedance coil produces an alternating flux in the magnetic circuit. Since the conventional control coil is wound around a portion of the magnetic circuit, it is cut by the flux emanating from the impedance coil, and there is thus an electromagnetic interaction between the two coils which serves to induce an alternating current in the control coil. As a result, special circuit provisions, usually involving the use of a pair of control coils, must be resorted to for optimum operation. This adds appreciably to the expense and size of the units in question.

I have discovered that an effective variable reactor can be produced utilizing but a single control coil or other source of uni-directional magnetic field, and without having any appreciable interaction between the impedance coil and that source, by orienting the saturating field source so that its own magnetic effect is at right angles to the alternating flux in the magnetic circuit of the reactor derived from the impedance coil. Hence the alternating flux does not link with the source of the saturating magnetic field. It is preferred to do this by positioning said source between a pair of magnetizable legs connected in parallel in the magnetic circuit of the reactor, said source being so oriented that its poles are oriented toward the legs respectively.

An important feature of the present invention is that, with this particular location and orientation of the source of the saturating field, it becomes entirely feasible to employ a permanent magnet as that source instead of a D. C. energized coil. The magnetic effect of that magnet on the reactor may be varied by physically moving the magnet with respect to the reactor so that greater or lesser areas of the magnet are operatively disposed with respect to the reactor, thus bringing at least a portion of the magnetic circuit of the reactor closer to or farther from a condition of saturation. The use of a permanent magnet for this purpose has the advantage over the use of a D. C. energized coil that no separate D. C. source of power is required and hence no electrical power consumption in the reactor is necessary for control purposes. In addition, the elimination of the need for a control coil may well in and of itself constitute an important economic advantage, and the elimination of the need for a device capable of varying the energization of the control coil, such as a variable resistance or potentiometer, is also significant, not only from the point of view of expense but also from the point of view of reliability and absence of sparking.

When, as is preferred for reasons of magnetic efficiency, the source of the saturating field is positioned between a pair of spaced magnetizable legs connected in parallel, the degree of saturation of different portions of those legs when alternating current is applied to the impedance coil will vary depending upon whether the flux produced by the impedance coil is at a given instant aiding or bucking the uni-directional field in the particular leg portions. Since the alternating flux will tend to follow that magnetic path which is least saturated, there will be a tendency for this alternating flux to pass through the saturating field source in a direction opposite to the magnetization of that source. When the source is defined by a permanent magnet, an appreciable de-magnetizing effect will be exerted thereon which may in a short time destroy the force of the magnet. When that source is defined by a D. C. energized coil the passage of the A. C. flux through the coil will tend to induce a voltage therein, although to a lesser extent than if the coil had been directly wound about a portion of the alternating flux magnetic circuit in conventional manner. These effects, inadmissible from a practical point of view when a permanent magnet is employed and undesirable when a D. C. energized coil is employed, may readily be eliminated by providing means connected between the two parallel-connected legs in the magnetic circuit for equalizing the flux therein. This means may constitute a short-circuited figure 8 coil ringing both legs, such a figure 8 coil preferably being provided to each side of the saturating field source. Single turns of highly conductive material are preferred because the flux equalizing effect of these coils is greatest when the resistance and inductance of these coils is lowest. Another means for promoting flux equalization between the two magnetizable legs is to use a short-circuited coil wound around the source, the axis of the short-circuited coil being parallel to the direction of magnetization of the source. Any tendency of the alternating flux to pass through the source will induce a current in this short-circuited coil, that coil in turn producing a flux opposing the alternating flux. Either of these means may be used alternatively, or they may be used together.

While the present invention has general applicability to the varying of the impedance of the coil no matter in what circuit that coil may be used, it is thought to be particularly useful in controlling the speed of operation of small size electric motors.

The device of the present invention may be readily constructed and assembled at low cost, its size and weight may be held within reasonable limits, its efficiency and durability are excellent, and its circuitry, both electrical and magnetic, is extremely simplified and straightforward. When a permanent magnet is used as a source of the saturating field there are no movable contacts and no spark-producing devices, and hence the units may be used in situations where the production of static which would interfere with normal radio reception is inadmissible or undesirable.

To the accomplishment of the above and to such other objects as may hereinafter appear, the present invention relates to a permanent magnet controlled saturable reactor as defined in the appended claims and as described in this specification taken together with the accompanying drawings in which:

Fig. 5 is a three quarter perspective view of a complete embodiment of the present invention utilizing a permanent magnet with the core of Fig. 4, the permanent magnet being shown substantially fully withdrawn from the magnetic core;

Fig. 6 is a three-quarter perspective view of another embodiment of the present invention utilizing a movable permanent magnet;

Fig. 7 is a fragmentary cross sectional view taken along the line 7—7 of Fig. 6;

Fig. 8 is a three-quarter perspective view of the magnetic assembly utilized with the embodiment of Fig. 6;

Fig. 9 is a view similar to Fig. 6 but illustrating the use of a D. C. energized control coil as the source for the uni-directional saturating magnetic field; and Fig. 10 is a schematic view illustrating the mode of operation of the present invention.

Figure 1:
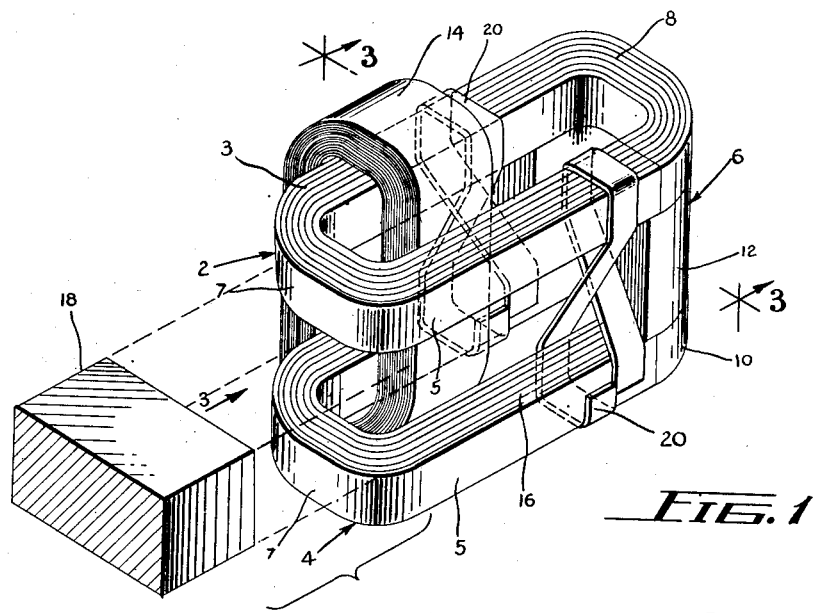
Fig. 1 is a three-quarter perspective view of one embodiment of the present invention utilizing a wound magnetic core and a permanent magnet.
Figure 2:
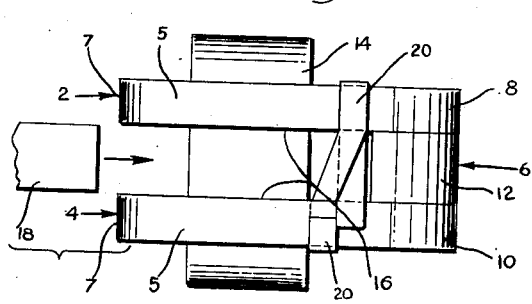
Fig. 2 is a front elevational view of the embodiment of Fig. 1.
Figure 3:
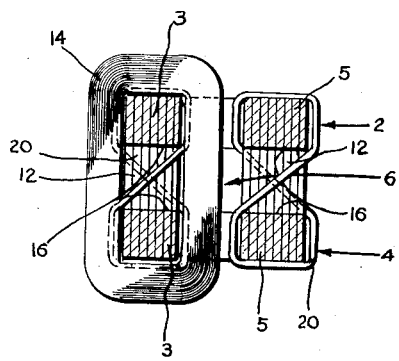
Fig. 3 is a cross sectional view taken along the line 3—3 of Fig. 1.

Turning first to the embodiment of Figs. 1–3, the magnetic core, formed of a plurality of wound strips of magnetizable material, is formed in three sections, to wit, upper and lower U-shaped sections 2 and 4 each of limited height and an end U-shaped section 6. The sections 2 and 4 are defined by legs 3 and 5 connected by portion 7. The section 6 is of appreciable height and has upper and lower portions 8 and 10 which meet the legs 3 and 5 and complete the magnetic loops defined in part by the sections 2 and 5, a central bridging portion 12 being interposed between the portions 8 and 10. The impedance coil 14 is wound around the legs 3 of the sections 2 and 4. A space 16 is provided between the corresponding legs 3 and 5 of the sections 2 and 4, and a permanent magnet 18 the magnetic poles of which are on the upper and lower surfaces thereof is adapted to be slid into the space 16 with its upper and lower surfaces facing the legs 5 of the upper and lower magnetizable sections 2 and 4 respectively. The magnet 18 will thus produce a magnetic field in the legs 5 between which it is positioned (and also to a lesser extent in the legs 3), the magnitude of that field being determined by the strength of the magnet 18 and the degree to which it is interposed between the legs 5, the more of the magnet interposed therebetween the greater being the magnitude of that field.

The magnetic loop will be completed through the bridging portion 12 of the core section 6. One magnetic loop may be traced from the upper face of the magnet 18 to the right along the leg 5 of the upper core section 2, down the bridging section 12 of the core section 6, to the left along the leg 5 of the lower core section 4 and then up to the lower face of the magnet 18. Another magnetic loop may be traced from the upper face of the magnet 18 to the left along the leg 5 of the upper core section 2, along the connecting portion 7 thereof, to the right along the leg 3 thereof, down the bridging section of the core section 6, to the left along the leg 3 of the lower core section 4, along the connecting portion 7 thereof, and to the right along the leg 5 thereof to the lower face of the magnet 18. The alternating magnetic field induced in the magnetic core by the current passing through the impedance coil 14 will pass along each of the legs 3 of the sections 2 and 4 encircled by the coil 14, along the parts 8 and 10 of the core sections 6, then along the other legs 5 of the core sections 2 and 4 and around the connecting portion 7 so as to return the legs 3. The legs 3 and 5 already have a uni-directional saturating magnetic field therein by reason of the action of the magnet 18. Hence, as will be described more in detail hereinafter, particularly in connection with Fig. 10, the effective impedance of the coil 14 will be determined by the magnitude of the uni-directional magnetic field produced therein by the magnet 18.

It is preferred, for reasons which will become apparent hereinafter particularly in connection with the discussion of Fig. 9, that equalizing coils 20 be employed, those coils being in the form of short-circuited figures 8 which loop around the legs 3 and 5 of the core sections 2 and 4. A pair of such equalizing coils are disclosed, one encircling the legs 5 and the other encircling the legs 3, both being positioned close to the end section 6 of the magnetic core. Thus each equalizing coil 20 is positioned to a different side of the magnet 18 in the magnetic circuit.

It will be seen from the above description that the magnet 18 is adapted to be interposed to a variable extent between the legs 5 of the upper and lower core sections 2 and 4, those legs being connected in parallel with one another in the magnetic circuit. The alternating magnetic flux derived from the impedance coil 14 when the latter is A. C. energized will also pass along the legs 5. The permanent magnet 18 defining the source of uni-directional saturating magnetic field has its direction of magnetization perpendicular to the direction of the legs 5, and hence perpendicular to the direction which the alternating magnetic flux will normally take as it passes through those legs.

Any suitable mechanical means may be employed for moving the magnet 18 between and out from the legs of the core sections 2 and 4. No specific disclosure thereof is deemed necessary, since the details thereof form no part of the present invention.

Figure 4:
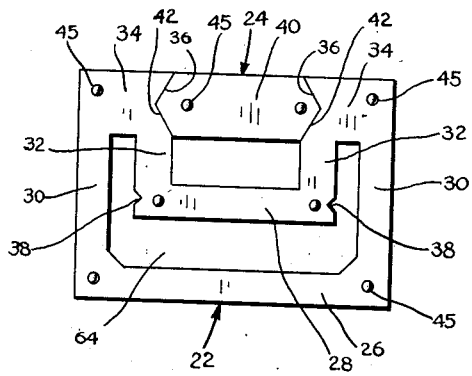
Fig. 4 is a top plan view of an assembled magnetic core useable in another embodiment of the present invention.

The embodiment of Figs. 4 and 5 discloses a structure particularly applicable when laminated magnetic cores are used to form the magnetic circuit. The core is formed in two sections generally designated 22 and 24. The laminations for the core section 22 are defined by a pair of horizontal legs 26 and 28 extending parallel to one another, the leg 26 being connected by vertical portions 30 and the leg 28 being connected by vertical portions 32 to spaced magnetizable portions 34 extending up therefrom and having angular opposed inner surfaces 36. The outer surfaces of the leg 28 are notched at 38. The laminations for the core section 24 are defined by a straight leg 40 having outer surfaces 42 which mate with the inner surfaces 36 of the portions 34, the impedance coil 44 being wound about the leg 40, the latter then being inserted and secured in place. The laminations are held together by rivets 45 in conventional manner. The magnetizable paths defined respectively by the elements 26, 30 and 28, 32 are connected in parallel in the magnetic circuit by means of the portions 34, and are collectively connected in the magnetic circuit in series with the leg 40. Equalizing coils 46 of figure 8 in shape encompass each pair of parallel portions 30, 32.

The magnet 48 defining the source of the uni-directional saturating magnetic field is secured between a pair of top and bottom plates 50 of some non-magnetizable material such as aluminum, and guides 52 having notches 54 at their surfaces are provided on each side of the assembly between the plates 50, these guides 52 also being of some non-magnetizable material such as brass. A pair of channel-shaped elements 56 are employed the upper flanges 58 of which fit into the notches 38 in the sides of the core leg 28 and the lower flanges 60 of which are received within the notches 54 in the brass guides 52. Resilient elements 62 are received between the outer surfaces of the channel members 56 and the inner surfaces of the lower part of the core portions 30, thus holding the channel members 56 and through them the magnet 48 in position. The channel members 56 project out beyond one side of the magnetic core to an appreciable extent so as to guide the magnet 48 in its movement into and out from the space 64 between the legs 26 and 28. The poles of the magnet 48 are respectively on its upper and lower surfaces.

Therefore in the embodiment of Figs. 4–5, as in the embodiment of Figs. 1–3, the magnet 48 which defines the source of uni-directional saturating magnetic field is positioned between the legs 26 and 28, those legs being connected in parallel in the magnetic circuit and being traversed by the alternating flux derived from the impedance coil 44 when it is energized. The orientation of the magnetic field of the magnet 48 is at right angles to those legs 26, 28, and consequently at right angles to the direction which the alternating flux would normally take in passing through those legs. The equalizing coils 46 are positioned to opposite sides of the magnet 48.

The embodiment of Figs. 6–8 is essentially similar to that of the embodiment of Figs. 4 and 5, and similar reference numerals are employed to identify comparable parts. The differences are as follows: In Fig. 6 the inner surfaces of the magnetizable portions 34, instead of being arrow shaped as in Figs. 4 and 5, have a dovetailed shape, as at 36', the outer surfaces of the leg 40 being correspondingly dovetailed as at 42'. The magnet 48 is retained between pole shoes 66 of magnetizable material, those shoes extending laterally beyond the magnet 48, cylindrical bearing rods 68 being mounted therebetween. V-shaped springs 70 have feet 72 which engage the inner surface of the lower parts of the core portions 30, the apices 74 of those springs 70 being received between the cylindrical bearing rods 68. Thus a somewhat different mounting for the magnet 48 is provided which still permits that magnet to be slid into and out from the space 64 between the legs 26 and 28. In the embodiment of Figs. 6–8 a short-circuited damping coil 76 of high conductivity is wrapped around the sides of the magnet 48, the purpose of which is described below.

Fig. 9 is a view of a reactor constructed similarly to that of Fig. 6, but in which the source of the uni-directional saturating magnetic field is a D. C. energized coil 49 instead of the magnet 48, this coil being wound about a suitable magnetizable core and being secured in place between the legs 26 and 28 in any appropriate manner, as by cementing, the axis of the coil 49 being perpendicular to the legs 26, 28 so that the magnetic field produced by the coil 49 when it is energized will also be oriented perpendicular to the legs 26, 28, and thus will be oriented similarly to the magnetic field produced by the permanent magnet 48 of the embodiment of Fig. 6. The magnitude of the uni-directional saturating magnetic field may be varied in conventional manner by controlling the magnitude of the current passing through the coil 49. Because the coil 49 is oriented at right angles to the legs 26, 28, and because the alternating flux produced by the impedance coil 44 normally passes along those legs and therefore is oriented at right angles to the coil 49, there will under ideal conditions be no interaction between the alternating flux and the coil 49, and thus a single control coil may be employed and simple circuitry may be used to energize that control coil without sacrifice of desirable operating characteristics. It will be understood that a similar substitution of D. C. energized coil and permanent magnet could be made in any of the embodiments here illustrated.

The mode of operation of the saturable reactor of the present invention can best be seen from schematic Fig. 10, which shows a magnetizable core having a leg 40 on which the impedance coil 44 is wound and the legs 26 and 28 between which permanent magnet 48 is positioned, the uni-directional field of that permanent magnet being shown by broken lines identified by the reference numeral 78. Equalizing coils 46 are also shown. Since the impedance coil 44 will normally have an alternating current applied thereto, the magnetic field induced thereby in the magnetic circuit will alternate in direction, one direction thereof being indicated by the dot-dash arrows 80 and the other direction thereof being indicated by the solid line arrows 82.

During that portion of the cycle of the current in the impedance coil 44 such that the magnetic field induced thereby will correspond to the dot-dash arrows 80, when that magnetic field reaches the legs 26 and 28 it will, in tending to move upwardly through the lower part of the leg 26, act in the same direction as the flux 78 from the permanent magnet 48, thus bringing that portion of the leg up to or close to saturation. The bulk of the flux 80 will therefore tend to pass through the lower half of the left hand leg 28, where it acts in opposition to the flux 78 and thus reduces the degree of saturation. The effect is opposite for the upper halves of the legs 26 and 28, the flux 80 thus tending to pass through the permanent magnet 48 in a direction opposite to the magnetization thereof in order to reach the relatively unsaturated upper portion of the leg 26 instead of the relatively saturated upper portion of the leg 28. When the direction of the current in the impedance coil 44 is reversed, thus giving rise to the flux 82, the situation in the legs 26 and 28 is correspondingly reversed, the flux 82 tending to pass downwardly through the upper half of the leg 28, where it acts in opposition to the flux 78 and thus reduces saturation of that leg, the flux 82 then passing across the magnet 48 in opposition to its magnetization and down through the lower face of the leg 26. It will be apparent that the degree to which the magnet 48 is inserted between the legs 26 and 28 will control the magnitude of the flux 78, this in turn will control the degree of saturation of the legs 26 and 28, the fluxes 80 and 82 will be affected by that saturation in known manner, and the impedance of the coil 44 will be correspondingly affected.

One drawback to the system as thus far described in connection with Fig. 10 (the effect of the equalizing coils 46 has not yet been dealt with) is that a de-magnetizing force fluctuating with twice the frequency of the current applied to the impedance coil 44 is being exerted on the magnet 48 whenever the coil 44 is energized. This in a short time would give rise to deterioration of the magnetic effect of the magnet 48. When a D. C. energized coil, such as the coil 49 of Fig. 9, is employed instead of the permanent magnet 48, this tendency of the alternating flux 80, 82 to cross over would not be as serious, but it would nevertheless provide for interaction between the alternating flux and the control coil 49, and one of the objects of the present invention is to avoid that interaction to as great a degree as possible. It should be noted, however, that even with the system as thus far described in conjunction with Fig. 10, an improvement over the prior art arrangements will be realized, because not all of the alternating flux will pass through and interact with the coil 49, whereas in the prior art arrangements all of the alternating flux passed through the control coil.

It is here that the equalizing coils 46 play their part. Because they electromagnetically link the legs 26 and 28 they tend to cause the flux density in those legs to be substantially equal to one another. In other words the saturation which may occur in the upper half of the leg 28 will, through the action of the upper equalizing coil 46, produce a bucking or counter-magnetomotive force in the upper portion of the leg 26, and the lower equalizing coil 46 will produce a similar equalizing effect in the lower halves of the legs 26 and 28. The lower the resistance and inductance of the coils 46 the more effective is their action in this regard. It therefore is preferred, as is clearly shown in Figs. 6 and 7, to construct these coils of fairly heavy strips or wires of copper or the like.

The result of the use of the equalizing coils 46 is twofold. They not only tend to cause both legs 26 and 28 to have the same degree of saturation, thus smoothing the action of the device, but they also greatly decrease and practically minimize any tendency for the flux 80, 82 to shift from one leg 26, 28 to the other midway of the length of those legs, since both legs are now substantially in the same magnetic condition relative to saturation. When a permanent magnet 48 is employed as the source of the saturating magnetic field, no appreciable de-magnetizing effect will be exerted thereon. When a D. C. energized coil 49 is employed as a saturating field source, there will be no appreciable electromagnetic interaction between the alternating flux and the coil 49.

The damping coil 76 shown in Fig. 6 serves a function similar to that of the equalizing coils 46. That damping coil 76 is wound around the source of the saturating magnetic field so that its axis is parallel to that of the saturating field. Hence any tendency of the alternating flux to pass through the source would induce a current in the damping coil 76 which would in turn induce a flux opposing the alternating flux. The damping coil 76 may be used instead of the equalizing coils 46, or may be used in conjunction therewith.

The device of the present invention is simple, compact, efficient and dependable. When a D. C. energized coil is employed to produce the saturating field there will be no appreciable interaction between that coil and the alternating flux. Hence a single coil and simple circuitry may be employed without sacrifice of operating characteristics. When a permanent magnet is employed as the source of the saturating field, the circuitry is greatly simplified, no power consumption is required in order to achieve control, and any type of mechanical linkage may be employed to position the permanent magnet, the only moving part in the entire system.

While several embodiments of the present invention have been here disclosed, it will be apparent that many variations may be made in the details thereof, for example, in the nature of the source of the saturating field, the manner in which that source is supported and controlled, and the specific constructional features, all within the spirit of the invention as defined in the following claims.

I claim:
1. A saturable reactor comprising a first magnetizable leg on which is wound a coil the impedance of which is to be varied, said leg being connected in a magnetic circuit in series with second and third magnetizable legs magnetically connected in parallel with one another and physically spaced from one another, a source of uni-directional magnetic field between said second and third legs and oriented so that its poles are directed toward said legs respectively, means for varying the magnitude of the uni-directional magnetic field produced by said source, and a pair of continuous conductors of effective figure 8 configuration, each looped around said second and third legs, one being positioned to one side of said source and the other being positioned to the other side of said source.

2. The reactor of claim 1, in which said source is defined by a permanent magnet movable between said second and third legs so that varying areas of said magnet are interposed between said legs, thereby providing for variation of the magnitude of the uni-directional field produced thereby in said reactor.

3. A saturable reactor comprising three parallel magnetizable legs magnetically connected at their ends, a coil the impedance of which is to be varied wound on an outer one of said legs, a permanent magnet positioned between the other two legs and operatively supported by said reactor for movement into and out of the space between said other two legs, and a pair of continuous conductors of effective figure 8 configuration, each looped about said other two legs and each positioned on opposite sides of said magnet and between said magnet and said outer one of said legs.

4. A saturable reactor comprising three parallel magnetizable legs magnetically connected at their ends, a coil the impedance of which is to be varied wound on an outer one of said legs, a permanent magnet positioned between the other two legs, magnet supporting means mounted on said reactor, said magnet being movably operatively connected to said supporting means so as to be movable into and out of the space between said other two legs, and a pair of continuous conductors of effective figure 8 configuration, each looped about said other two legs and each positioned on opposite sides of said magnet and between said magnet and said outer one of said legs.

5. A saturable reactor comprising a loop of magnetic material including upper and lower spaced legs connected at their ends by substantially vertical portions, a coil the impedance of which is to be varied wound about said upper leg, a third leg of magnetizable material positioned between said upper and lower legs and connected to said upper leg by substantially vertical magnetizable portions spaced from said previously mentioned vertical portions, a source of uni-directional magnetic field positioned between said third and lower legs and oriented so that its poles are directed toward said legs respectively, and means for varying the magnitude of the uni-directional magnetic field produced by said source.

6. The reactor of claim 5, in which the vertical magnetizable portions connected to said third leg are respectively positioned adjacent said first mentioned vertical portions, and a pair of continuous conductors of effective figure 8 configuration, each looped around one of said vertical magnetizable portions connected to said third leg and the corresponding first mentioned vertical portion.

7. The reactor of claim 6, in which the portion of said upper leg on which said coil is wound is separable from said reactor, the other legs and portions of magnetizable material defining a self-sustaining unit.

8. The reactor of claim 6, in which said source is defined by a permanent magnet movable between said third and lower legs so that varying layers of said magnet are interposed between said legs, thereby providing for variation of the magnitude of the uni-directional magnetic field produced thereby in said reactor.

9. The reactor of claim 6, in which said source is defined by a permanent magnet movable between said third and lower legs so that varying layers of said magnet are interposed between said legs, thereby providing for variation of the magnitude of the uni-directional magnetic field produced thereby in said reactor, and in which the portion of said upper leg on which said coil is wound is separable from said reactor, the other legs and portions of magnetizable material defining a self-sustaining unit.

10. The reactor of claim 5, in which said source is defined by a permanent magnet movable between said third and lower legs so that varying layers of said magnet are interposed between said legs, thereby providing for variation of the magnitude of the uni-directional magnetic field produced thereby in said reactor, and in which the portion of said upper leg on which said coil is wound is separable from said reactor, the other legs and portions of magnetizable material defining a self-sustaining unit.

11. The reactor of claim 5, in which the portion of said upper leg on which said coil is wound is separable from said reactor, the other legs and portions of magnetizable material defining a self-sustaining unit.

References Cited in the file of this patent

UNITED STATES PATENTS

| | | |
|---|---|---|
| 2,281,593 | Odessey | May 5, 1942 |
| 2,363,881 | Lord | Nov. 28, 1944 |
| 2,703,391 | Gunderson | Mar. 1, 1955 |
| 2,719,276 | Allison | Sept. 27, 1955 |

FOREIGN PATENTS

| | | |
|---|---|---|
| 261,948 | Italy | Dec. 31, 1928 |